United States Patent
Park et al.

(10) Patent No.: US 8,756,470 B2
(45) Date of Patent: Jun. 17, 2014

(54) SYSTEM AND METHOD FOR DYNAMIC HYBRID AUTOMATIC REPEAT REQUEST (HARQ) ENABLE/DISABLE

(71) Applicant: Clearwire IP Holdings LLC, Bellevue, WA (US)

(72) Inventors: Sungki Park, Ashburn, VA (US); Masoud Olfat, Great Falls, VA (US); Dhaval Dipak Mehta, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

(21) Appl. No.: 13/674,580

(22) Filed: Nov. 12, 2012

(65) Prior Publication Data

US 2013/0070629 A1  Mar. 21, 2013

Related U.S. Application Data

(63) Continuation of application No. 12/434,063, filed on May 1, 2009, now Pat. No. 8,312,337.

(51) Int. Cl.
*G06F 11/00* (2006.01)

(52) U.S. Cl.
USPC .......................................................... 714/748

(58) Field of Classification Search
USPC .......................................... 714/748; 370/252
See application file for complete search history.

(56) References Cited

U.S. PATENT DOCUMENTS

| | | | |
|---|---|---|---|
| 6,035,183 A | 3/2000 | Todd et al. | |
| 6,404,826 B1 | 6/2002 | Schmidl et al. | |
| 7,764,744 B2 | 7/2010 | Choi et al. | 375/267 |
| 8,233,434 B2 | 7/2012 | Park et al. | |
| 8,312,337 B2 * | 11/2012 | Park et al. | 714/748 |
| 8,509,156 B2 | 8/2013 | Park et al. | 370/328 |
| 2002/0012343 A1 | 1/2002 | Holloway et al. | |
| 2002/0041570 A1 * | 4/2002 | Ptasinski et al. | 370/252 |

(Continued)

FOREIGN PATENT DOCUMENTS

| | | |
|---|---|---|
| JP | H07-212299 | 8/1995 |
| JP | 2005-244991 | 9/2005 |

(Continued)

OTHER PUBLICATIONS

Japanese Application No. 2009-275381, Request for Accelerated Examination filed Mar. 15, 2010, with English translation, 5 pages.

(Continued)

*Primary Examiner* — Yair Leibovich

(57) ABSTRACT

A system and method of increasing data throughput in a wireless communications network between a base station (BS) and one or more mobile stations (MS) includes establishing a service flow (SF) and initially enabling a hybrid automated repeat request (HARQ) protocol; determining, at a particular time, the measure of quality of the communications channel; comparing the determined measure of quality with a predetermined channel quality threshold; and selectively disabling the HARQ protocol based upon a first comparison result while continuing the SF between the BS and MS. In other aspects, after selectively disabling the HARQ protocol, the method further includes determining that the time-varying measure of quality of the communications channel has deteriorated below the predetermined channel quality threshold; and selectively re-enabling the HARQ protocol in the established SF.

13 Claims, 8 Drawing Sheets

(56) References Cited

U.S. PATENT DOCUMENTS

| | | |
|---|---|---|
| 2003/0036385 A1 | 2/2003 | Uehara et al. |
| 2004/0218545 A1* | 11/2004 | Pedersen ............... 370/252 |
| 2004/0259555 A1 | 12/2004 | Rappaport et al. |
| 2005/0227697 A1 | 10/2005 | Borst et al. |
| 2006/0057965 A1 | 3/2006 | Braun et al. |
| 2006/0193373 A1 | 8/2006 | Agee et al. |
| 2007/0115874 A1 | 5/2007 | Usuda et al. |
| 2007/0183380 A1 | 8/2007 | Rensburg et al. |
| 2007/0211813 A1 | 9/2007 | Talwar et al. |
| 2007/0232359 A1 | 10/2007 | Pinheiro et al. |
| 2007/0254597 A1 | 11/2007 | Li et al. |
| 2008/0014915 A1 | 1/2008 | Usuda et al. |
| 2008/0025422 A1 | 1/2008 | Bitran et al. |
| 2008/0059859 A1* | 3/2008 | Marinier et al. ............ 714/748 |
| 2008/0132173 A1 | 6/2008 | Sung et al. |
| 2008/0144626 A1* | 6/2008 | Bertinelli et al. ............ 370/392 |
| 2008/0220788 A1 | 9/2008 | Stanwood et al. |
| 2008/0253342 A1 | 10/2008 | So et al. |
| 2008/0273610 A1 | 11/2008 | Malladi et al. |
| 2008/0310338 A1 | 12/2008 | Charpenter et al. |
| 2008/0310395 A1 | 12/2008 | Kashima |
| 2008/0317014 A1 | 12/2008 | Veselinovic et al. |
| 2008/0320354 A1 | 12/2008 | Doppler et al. |
| 2009/0003257 A1 | 1/2009 | Kumar et al. |
| 2009/0022254 A1 | 1/2009 | Na et al. |
| 2009/0034526 A1 | 2/2009 | Ahmadi et al. |
| 2009/0040993 A1 | 2/2009 | Kim et al. |
| 2009/0052390 A1 | 2/2009 | Gu et al. |
| 2009/0059801 A1 | 3/2009 | Garrett et al. |
| 2009/0059857 A1 | 3/2009 | Kim et al. |
| 2009/0080374 A1 | 3/2009 | Lee et al. |
| 2009/0083431 A1 | 3/2009 | Balachandran et al. |
| 2009/0086657 A1* | 4/2009 | Alpert et al. ............... 370/310 |
| 2009/0086704 A1 | 4/2009 | Ho |
| 2009/0086855 A1 | 4/2009 | Jin et al. |
| 2009/0092099 A1 | 4/2009 | Gu et al. |
| 2009/0131066 A1 | 5/2009 | Barve et al. |
| 2009/0219852 A1 | 9/2009 | Youn et al. |
| 2009/0300453 A1 | 12/2009 | Sahara |
| 2009/0310550 A1 | 12/2009 | Medapalli et al. |
| 2010/0014473 A1 | 1/2010 | Ofuji et al. |
| 2010/0042876 A1* | 2/2010 | Yue et al. ............... 714/704 |
| 2010/0278103 A1 | 11/2010 | Park et al. |
| 2010/0278160 A1 | 11/2010 | Park et al. |
| 2010/0281322 A1 | 11/2010 | Park et al. |
| 2011/0276852 A1 | 11/2011 | Mueller-Weinfurtner et al. |
| 2011/0305213 A1 | 12/2011 | Lohr et al. |
| 2012/0275388 A1 | 11/2012 | Park et al. |
| 2013/0315148 A1 | 11/2013 | Park et al. ............... 370/328 |

FOREIGN PATENT DOCUMENTS

| | | |
|---|---|---|
| JP | 2005-531247 | 10/2005 |
| JP | 2009-021787 | 1/2009 |
| WO | WO 2004/004173 | 1/2004 |
| WO | WO 2008/044529 | 4/2008 |

OTHER PUBLICATIONS

Japanese Application No. 2009-275381, Japanese Office Action mailed May 14, 2010 with English translation, 6 pages.

Japanese Application No. 2009-275381, Office Action mailed Nov. 22, 2010 with English translation, 4 pages.

International Patent Application No. PCT/US2010/032981, International Search Report and Written Opinion mailed Jul. 2, 2010, 13 pages.

International Patent Application No. PCT/US2010/032986, International Search Report and Written Opinion mailed Jul. 2, 2010, 10 pages.

\* cited by examiner

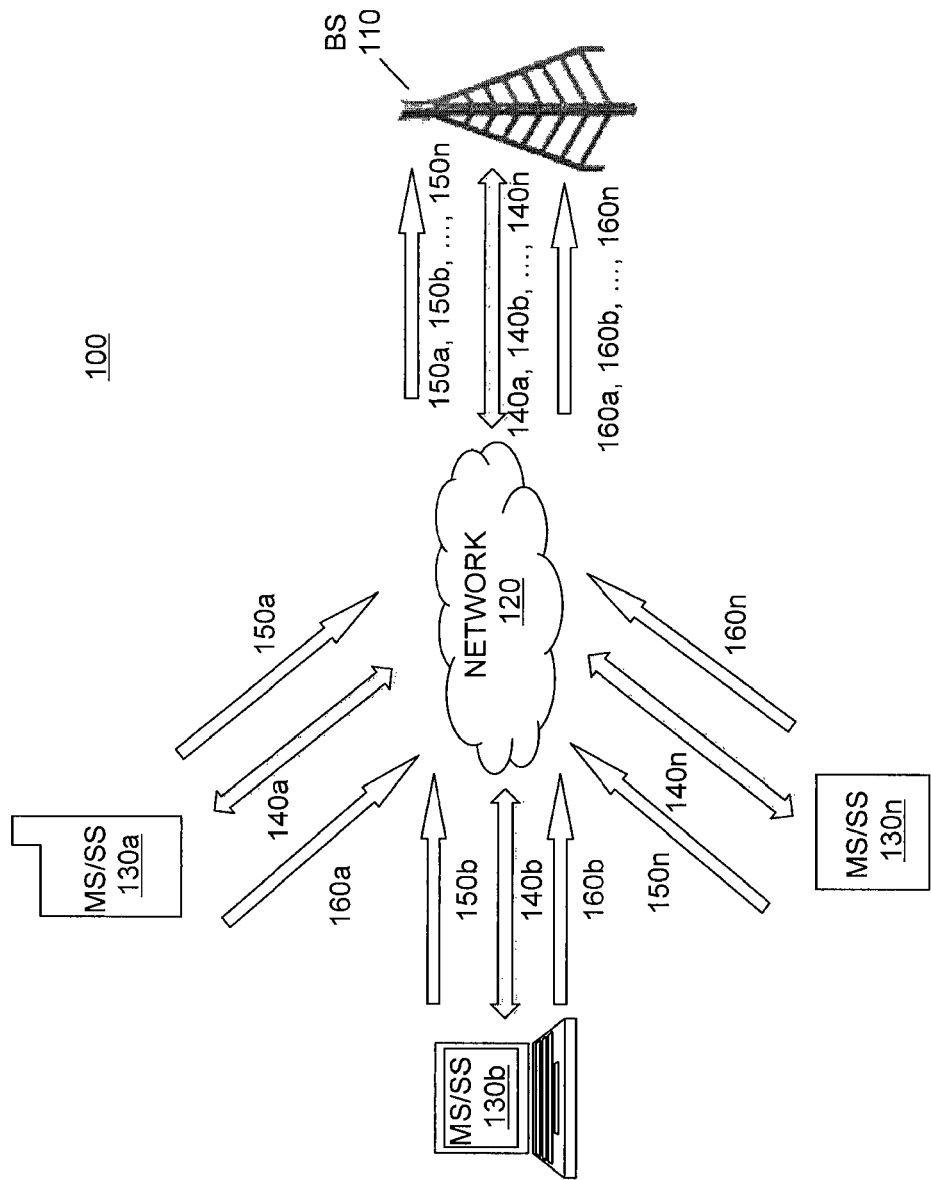
FIG. 1 (BACKGROUND)

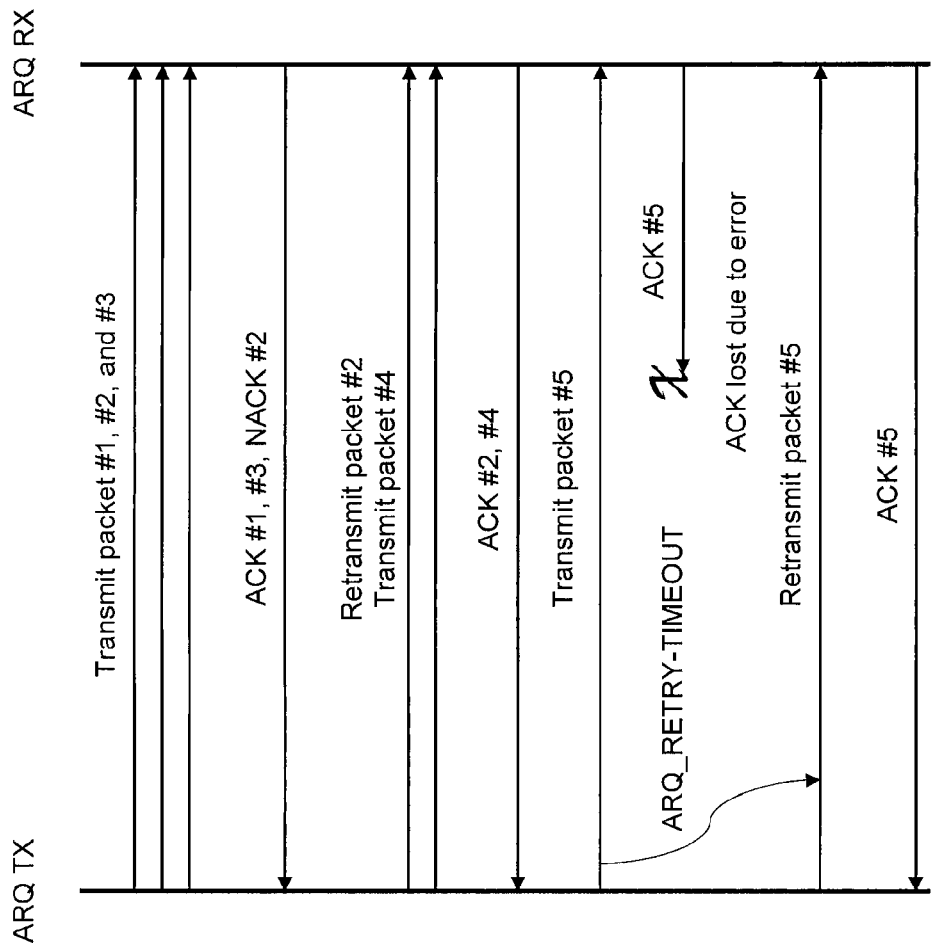
FIG. 2 (BACKGROUND)

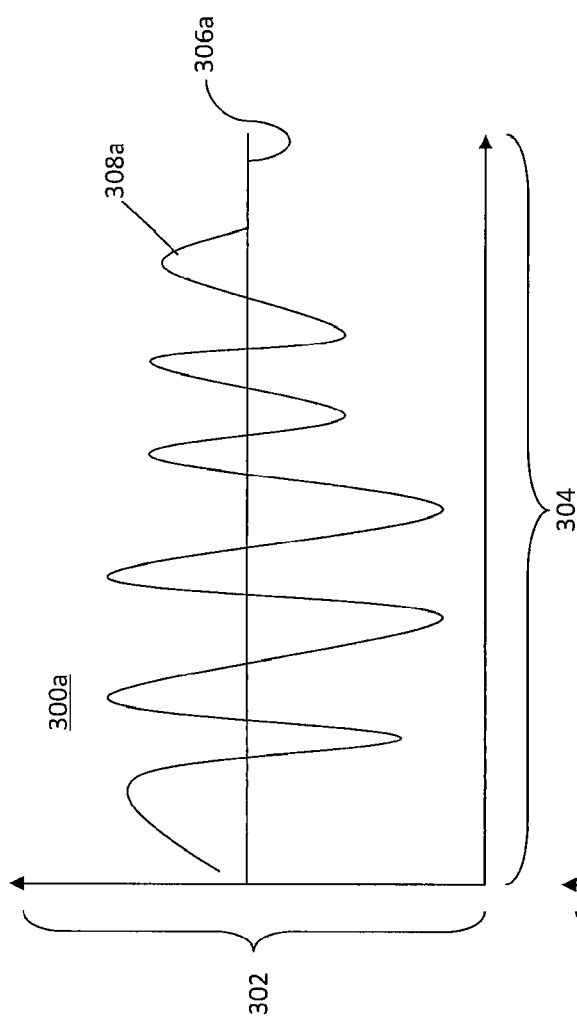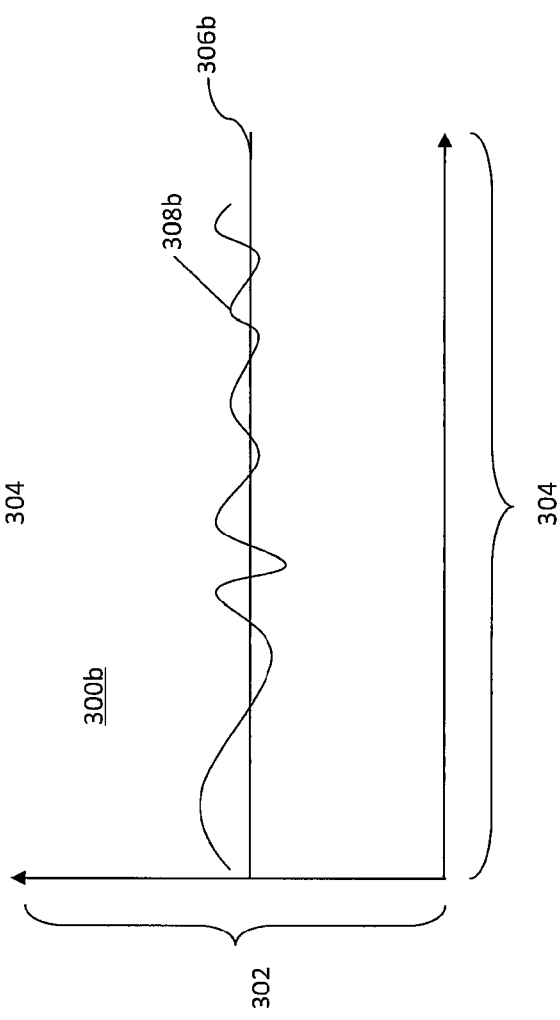

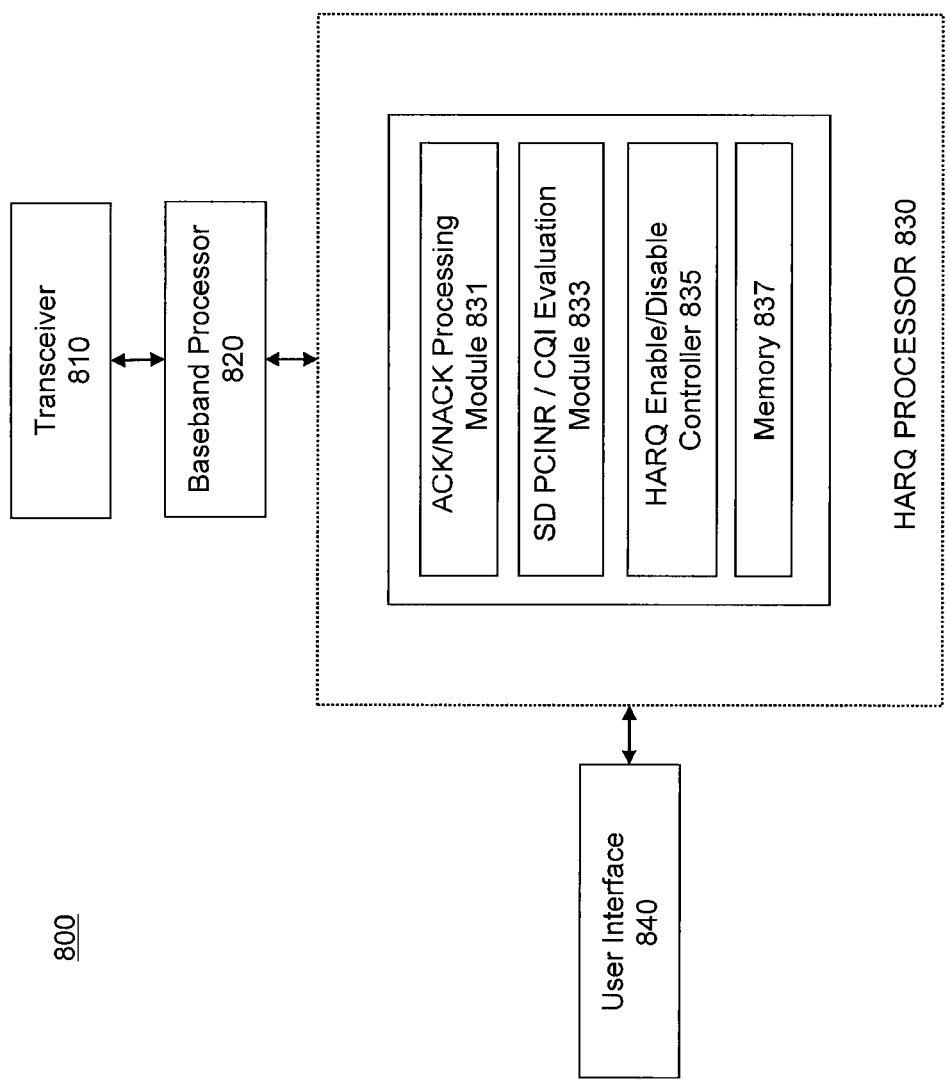

SYSTEM AND METHOD FOR DYNAMIC HYBRID AUTOMATIC REPEAT REQUEST (HARQ) ENABLE/DISABLE

CROSS-REFERENCE TO RELATED APPLICATIONS

This Application is a continuation of U.S. patent application Ser. No. 12/434,063, filed May 1, 2009, now U.S. Pat. No. 8,312,337, which is hereby incorporated by reference herein in its entirety. This Application is related to U.S. patent application Ser. No. 12/434,029, filed May 1, 2009, entitled "System and Method for Hybrid Schemes of MIMO Mode Decision" and U.S. patent application Ser. No. 12/434,047, filed May 1, 2009, now U.S. Pat. No. 8,233,434, entitled "System and Method for Adaptive Control of an Averaging Parameter," both of which are hereby incorporated by reference herein in their entirety.

BACKGROUND

In one or more embodiments, this disclosure is directed to a system and method useful for generating and processing automatic repeat request (ARQ) signals in wireless communications networks. In particular, this application is directed to a system and method for dynamic control of ARQ signals in wireless communications networks that involve a hybrid approach over conventionally known signal protocols and communications standards. Even more particularly, this application is directed to a system and method for improving communication channel performance by the dynamic control of hybrid ARQ (HARQ) in Broadband Wireless Access (BWA) communications systems based upon monitoring and selectively responding to changing communication channel conditions to improve data throughput and/or the number of users that may access the communications network.

As a result of the demand for longer-range wireless networking, the IEEE Standard 802.16 was developed. The IEEE 802.16 standard is often referred to as Wireless Metropolitan Area Network (WiMAX), "mobile WiMax", or less commonly as WirelessMAN or the Air Interface Standard. This standard provides a specification for fixed broadband wireless metropolitan access networks ("MANs") that use a point-to-multipoint architecture. Such communications can be implemented, for example, using orthogonal frequency division multiplexing ("OFDM") communication. OFDM communication uses a spread spectrum technique distributes the data over a large number of carriers that are spaced apart at precise frequencies. This spacing provides the "orthogonality" that prevents the demodulators from seeing frequencies other than their own. Expected data throughput for a typical WiMAX network is 45 MBits/sec per channel. The 802.16e standard defines a media access control ("MAC") layer (OSI level 2, sometimes referred to as the "Radio Link Control" or "RLC" layer) that supports multiple physical layer specifications customized for the frequency band of use and their associated regulations. This MAC layer uses protocols to ensure that signals sent from different stations using the same channel do not interfere with each other or "collide".

The IEEE 802.16 system architecture, for example, consists of two logical entities, the Base Station (BS) and the Subscriber Station (SS). Both the BS and SS have instances of the IEEE 802.16 MAC and Physical Layer 1 (PHY), in addition to other support functions. However, specific functions performed by the MAC or PHY differ depending on whether it is a BS or SS, and the IEEE 802.16 standard defines the BS- and SS-specific behavior in detail. The term SS is applied in a fixed context, while the MS is used in a mobile environment, as introduced by IEEE Std 802.16e.

In Point-to-Point (PtP) and Point-to-Multipoint (PMP) networks, the BS and SS are in a master-slave relationship, where the SS must obey all medium access rules enforced by the BS. The mobile station (MS) defined in the IEEE 802.16 mobility extension (IEEE Std 802.16e) requires support for additional SS-specific functions such as mobility management, handoff, and power conservation. In this disclosure, the term "SS" is intended to not only include fixed or relatively immobile terminal equipment, but to also include MS functionality of mobile user terminal equipment, unless specifically stated otherwise. One of the basic differences between the BS and SS in a PMP network configuration is that the BS, which acts as a centralized controller and a centralized distribution/aggregation point, has to coordinate transmissions to/from multiple SSs, whereas the SS need only to deal with one BS. All traffic originating from an SS, including all SS-to-SS traffic must go through the BS. Therefore, in a typical IEEE 802.16 system, the BS has to have additional processing and buffering (i.e., memory) capability in comparison to a typical SS to support a reasonable number of SSs.

The functions of the BS and SS depend on the operation mode, namely, PMP or mesh. The functions of the Base Station include:

Enforce MAC and physical parameters such as frame size.
Perform bandwidth allocation for downlink and uplink traffic per SS.
Perform centralized Quality of Service (QoS) scheduling based on the QoS parameters configured by the management system and the active bandwidth requests received from the SS.
Transmit/receive data and control information to/from one or more SSs.
Provide SS support services like ranging, clock synchronization, power control and handover.

The functions of the Subscriber Station or Mobile Station include:

Identify the BS, acquire physical synchronization, obtain MAC parameters and join the network.
Establish basic connectivity, setup data and management connections and negotiate parameters as needed.
Generate bandwidth requests for connections.
Receive all scheduling and channel information broadcasted and proceed according to the medium access rules provided by the BS, unless in sleep mode.
Perform specific functions for mobility management, handover and power conservation.

Various methods and metrics have been developed to indicate the channel condition or Channel Quality Indicator (CQI). Exemplary metrics include a Physical Carrier to Interference plus Noise Ratio (PCINR), a Received Signal Strength Indicator (RSSI), an ACK/NACK ratio that indicates a proportion of successful data transmissions to unsuccessful transmission (thereby indicating channel stability), PCINR Standard Deviation (SD) that may indicate Doppler and fading effects that result from movement of the MS, and other indicators. These indicators may be generated at the MS or SS and transmitted to the BS by known techniques of representing the CQI. The BS may receive the channel condition indicators, e.g., CQI, and attempt to adjust communication in response to changes to the channel condition. For example, the BS may perform download link adaption such as, for example, selecting an appropriate Modulation Coding Scheme (MCS) according to the channel condition in response to various changes to the channel condition. Knowing current and accurate channel condition information may enhance the ability of the BS to respond to changes to the channel condition. Current systems, however, are not configured to make use of such channel condition information to change various signaling parameters, particularly in an automated fashion.

Manual selective implementation of a well-known error control technique for data transmission, Automatic repeat-request (ARQ), utilizes acknowledgments and timeouts to achieve reliable data transmission. ARQ acknowledgments are messages sent by the receiver to the transmitter to indicate that the receiver correctly received an information unit. Timeouts are reasonable points in time after the sender transmits the information unit. The sender usually re-transmits the information unit if it does not receive an acknowledgment before the timeout. It continues to re-transmit the information unit until it either receives an acknowledgment from the receiver or exceeds a predefined number of re-transmission attempts. FIG. 2 depicts a notional timeline and message flow for packet transmission/acknowledgement and retransmission in cases where no acknowledgement (negative acknowledgement or NACK) of a transmitted packet is received.

Conventional types of ARQ protocols include "stop-and-wait ARQ", "go-back-N ARQ" and "selective repeat ARQ". These protocols typically reside in the Data Link or Transport Layer 2 of the OSI 7-layer model.

Conventional Hybrid ARQ (HARQ) is a commonly used extension of the ARQ error control method that exhibits better performance, particularly over wireless channels, but at the cost of increased implementation complexity. HARQ is used in several conventional wireless communications systems including High-Speed Downlink Packet Access (HSDPA) and High-Speed Uplink Packet Access (HSUPA) (i.e., third generation mobile telephony communications protocols in the High-Speed Packet Access (HSPA) family) which allow networks based on Universal Mobile Telecommunications System (UMTS) to have higher data transfer speeds and capacity on downlink and uplink, respectively, for mobile phone networks using the UMTS.

HARQ has also been used in the currently implemented IEEE 802.16-2005 standard for mobile broadband wireless access, i.e., "mobile WiMAX". Presently, HARQ provides an important technology for increasing data transmission reliability and data throughput in mobile communication systems. Specifically, in the WiMax implementation, HARQ refers to a combination of ARQ and PHY layer reception techniques like Forward Error Correction (FEC) and signal combining techniques. Different from ARQ operating solely at the MAC layer, HARQ allows the receiver to perform soft-combining of retransmitted packets and therefore may provide some measure of improvement in spectral efficiency. There are two well-known HARQ techniques: the first known as Incremental Redundancy (IR) and the second known as chase combining, discussed further below.

HARQ is an important technique for link adaptation, and makes aggressive modulation and coding schemes (MCS) decisions possible, e.g., the use of OFDM. Thus, the use of HARQ can result in considerable increased data throughput, and/or can enable more users to access the network. In HARQ, the transmitter and the receiver cooperate on an information unit (HARQ sub burst, burst, packet or block) level. The receiver is capable of indicating successful (via ACKs) or unsuccessful (via NACKs) reception of the last transmitted information unit or block. The transmitter comprises several parallel HARQ sub processors (e.g., in 802.16e referred to as HARQ sub-channels), each of which performs operations of transmitting user information units, receiving ACK/NACK information or other ACK indications in response, and performing either a retransmission when needed or transmitting the next information units. The ACK indication may be direct whereby a specific ACK or NACK indication is sent. In HARQ, the receiver takes advantage of any previous retransmissions by decoding the information unit or block based on information gathered from all the retransmissions of the same information unit or block, thus improving overall performance of the communications link.

In IEEE 802.16e, HARQ schemes are optional parts of the MAC layer, and can currently only be enabled on a per-terminal per connection basis, when a Service Flow (SF) is established between the BS and SS. The per-terminal HARQ and associated parameters are specified and negotiated during the initialization procedure, and currently cannot be altered for an established SF. In other words, once HARQ is enabled, it may not be changed during the duration of the particular SF.

As mentioned above, Chase Combining is used in the current WiMAX profile, although IEEE 802.16e also supports IR. A SS may support IR, while a MS may support either Chase Combining or IR. For IR, the PHY layer will encode the HARQ packet generating several versions of encoded subpackets. Each subpacket is uniquely identified using a subpacket identifier (SPID). For Chase Combining, the PHY layer encodes the HARQ packet generating only one version of the encoded packet. As a result, no SPID is required for Chase Combining HARQ Chase Combining requires all retransmissions to send the exact same information and to use the original modulation-coding scheme (i.e. waveform). Note that HARQ retransmissions are asynchronous, in the sense that all HARQ bursts undergo opportunistic scheduling. The maximum number of retransmissions is determined by target residual Packet Error Rate (PER). Typically the number of HARQ retransmissions is set to four, for a PER of $1 \times 10^{-4}$ (this is the case for IR as well).

A benefit of employing HARQ is that it can be used to mitigate the effects of channel and interference fluctuation. HARQ provides an improvement in performance due to the SNR improvement derived from the energy and time diversity gain achieved by (1) combining retransmitted packets with previous erroneously decoded packets and/or (2) using Incremental Redundancy (IR) to realize additional coding gain.

Using WiMAX as an example, a resource region for HARQ ACK channels is allocated using the HARQ ACK region allocation Information Element (IE). This resource region may include one or more ACK channels for HARQ support-enabled MSs, e.g., ACKCH 150n in FIG. 1. The uplink (UL) ACK channel occupies half a slot in the HARQ ACK channel region, which may override the fast feedback region. This UL ACK channel is assigned implicitly to each HARQ-enabled burst, according to the order of the HARQ-enabled downlink (DL) bursts in the DL-MAP. Thus, using this UL ACK channel, SSs or MSs can quickly transmit ACK or NACK feedback for DL HARQ-enabled packet data.

HARQ may also divide into several types. In the simplest version of HARQ types, called Type I HARQ, both Error Detection (ED) and Forward Error Correction (FEC) information to each message prior to transmission. When the coded data block is received, the receiver first decodes the error-correction code. If the channel quality is sufficient, all transmission errors should be correctable, and the receiver can obtain the correct data block. If the channel quality is bad and not all transmission errors can be corrected, the receiver detects this situation using the error-detection code, the received coded data block is discarded, and the receiver requests retransmission. The more retransmissions that are required for successful reception, the less are the available resources (e.g., transmission power, number of available transmission slots) to provide data throughput for other users.

In the more sophisticated Type II HARQ, only (1) ED bits or (2) FEC information and ED bits are sent on a given transmission, typically alternating on successive transmissions. It is important to note that detection typically adds only a few bytes to a message, resulting in a relatively small incremental increase in message length. FEC, however, adds error correction parities, which often double or triple the message length. In terms of throughput, standard ARQ typically expends a few percent of channel capacity for reliable protection against error, while FEC ordinarily expends half or more of all channel capacity for channel improvement.

In Type II HARQ, the first transmission contains only data and error detection. If it is received in error, the second transmission includes FEC parities and error detection information. If the second transmission is received in error, error correction is attempted by combining the information received from both transmissions. Incorrectly received coded data blocks are often stored in buffer memory at the receiver rather than discarded. When the retransmitted block is received, the two blocks are combined, using a technique known as Chase Combining, which increases the likelihood of correctly decoding the message.

FIG. 1 depicts the architecture of a WiMAX network implemented in accordance with various aspects of IEEE Standard 802.16. In FIG. 1, base station (BS) 110 may communicate with one or more Mobile Stations/Subscriber Stations (MS/SS) 130a-130n over network 120 via an associated communication channel 140a-140n. In this disclosure, the terms "SS" and "MS" are used interchangeably, although it is recognized that MS implies the use of mobility enhancements. MS/SS 130a-130n may be relatively fixed or immobile terminal equipment, or may be equipment that includes the mobility functions of a MS, e.g., a cell phone or laptop computer traveling in an automobile or airplane. Various factors such as the existence of ambient interference around the SS or BS, movement of the SS, and other factors may degrade or otherwise alter the channel condition of the communication channel, making the use of HARQ desirable to ensure reliable communications over channels 140a-140n. HARQ uplink Acknowledgement Channels (ACKCH) 150a-150n allow each MS/SS 130a-130n to acknowledge packet receipt to the BS by use of a HARQ signal transmission over a dedicated HARQ ACK channel. Although HARQ provides advantages under some channel conditions, these ACKCH channels represent additional channel overhead that will decrease data throughput when channel conditions are such that communication may be reliably maintained without HARQ being used. Channel Quality Indicator (CQI) channels 160a-160n provide a path for the MS or SS to identify the relative quality of the communication channel to BS 110 using known techniques.

FIG. 2 depicts an example of conventional ARQ operation in which each packet is a MAC layer packet containing one or more ARQ blocks. MAC layer ARQ alone does not improve spectral efficiency. However, with its retransmission mechanism to correct packet errors at the cost of extra delays, ARQ provides a more reliable link layer as seen by applications, and permits link adaptation for higher spectral efficiency. As can be seen in FIG. 2, there may be some inefficiency when an ACK is lost due to error, and a correctly received packet is retransmitted.

Chase Combining HARQ in the PHY layer is supported to further improve the reliability of a retransmission stored in a HARQ buffer by combining one or more previous transmissions decoded in error. In HARQ Chase Combining, all retransmissions sent include the same information and use the original modulation-coding scheme (MCS). To streamline the HARQ feedback, a dedicated ACK channel is also provided on the transmission side for purposes of HARQ ACK/NACK signaling, e.g. ACKCH channels 150a-150n in FIG. 1.

In the case of WiMax (or other communication methodologies), the system may, from time to time, encounter communication channel conditions that result in or near complete packet reception, making the use of HARQ or other signaling protocols unnecessary, at least for a portion of the time the communication channel is in use for a particular SF. In this situation, the overhead associated with HARQ signaling (e.g., ACKCH 150a-150n in FIG. 1) must still be allocated because, in conventional systems known to date that implement a HARQ signaling scheme, e.g., WiMax, HARQ may only be enabled at the time a SF is established between a BS and SS, and there is no method or system that solves the problem of the increased overhead and decreased data throughput when HARQ may not be necessary for reliable communications.

Under the current WiMax standard, HARQ and associated parameters are specified and negotiated using Station Basic Capability-Request/Response (SBCREQ/RSP) messages during network entry or re-entry procedure. Under the Standard, a MS shall support per-connection based HARQ, and HARQ can be enabled on a per Connection ID (CID) basis by using Dynamic Service Addition/Dynamic Service Change (DSA/DSC) messages.

HARQ may be enabled or disabled by setting the "ACK disable" bit. HARQ is enabled if "ACK disable"=0, and is disabled otherwise, i.e. "ACK disable"=1. The DL HARQ sub-burst Information Element (IE) defines the "ACK disable" bit setting. However, it may be difficult to determine whether HARQ should be enabled or disabled during initial channel setup, and HARQ may not continue to be necessary if the communication channel's quality improves to an acceptable or desirable level.

A further problem with the current standards-based WiMAX implementation is that the HARQ Enable/Disable decision is fixed and static. The decision on HARQ Enable/Disable is made only when a Service Flow (SF) is setup. Once HARQ is enabled or disabled at the time the SF is established, the communication channel continues with the same HARQ configuration, i.e., no change during SF, regardless of the relative channel condition. Thus, even when channel quality is sufficient for a particular QoS requirement without HARQ, HARQ will continue to be used, resulting in increased network overhead.

Thus, even though conventional HARQ often serves useful purposes, there is a need for a system and method that are capable of enabling network elements in a communication link to dynamically select HARQ processing after a SF has been established to account for the availability of a good communication channel for which HARQ is not required at all times.

Further, the currently-implemented WiMAX implementation has difficulty in making a decision whether HARQ should be enabled or disabled when a new SF is setup since there generally is not enough information about the channel condition for a new SF. Currently, WiMAX always configures HARQ to be enabled in order to minimize the risk of low throughput on the downlink (DL) with the cost of a UL resource for ACKCH. Moreover, the number of Acknowledgement Channels must be increased with the number of users that are enabling HARQ, leading to decreased efficiency in terms of bandwidth utilization and increased overhead.

While the current 802.16 WiMAX standard states that ACK disable bit is configurable to be either a "1" or "0", the current implementation of the standard provides no guidance concerning when and under what circumstances the ACK disable bit should be set to either a "1" or "0". As it currently is implemented, any mechanism may be applied, which results in various implementation issues for a large number of stakeholders seeking to widely implement WiMAX.

What is needed for improved channel utilization and increased efficiency in WiMAX networks is a dynamically selectable HARQ Enable/Disable scheme that uses information on changing channel conditions to determine whether HARQ should continue to be enabled or disabled during an ongoing SF by selectively being able to set the "ACK disable" bit.

SUMMARY

The system and method of this disclosure provide various features, functions, and capabilities as discussed more fully in the detailed description, and as summarized below. For example, this disclosure provides a novel and useful signaling method and system for use in a communications link, with particular application in wireless telecommunication systems such as those adhering to IEEE 802.16 (WiMAX), 3GPP, 3GPP2, etc. communication standard specifications that utilize HARQ protocol mechanisms, but is not limited to use with these systems.

One major challenge in broadband wireless access networks is to provide fast, reliable services to time-sensitive communications. Embodiments of this disclosure provide a dynamic HARQ scheme for wireless communications systems which follows the multi-channel chase combining HARQ adopted by WiMAX, for example, while enabling the base station (BS) to proactively react to poor channel conditions by selectively implementing HARQ on a per burst or frame basis.

Various embodiments of this disclosure dynamically implement HARQ by enabling the BS to selectively enable or disable the use of HARQ after a SF has been established, thus reducing overhead and increasing data throughput and/or the number of users that may access the communications network.

In one or more embodiments, a Dynamic Enable/Disable system and method are disclosed where HARQ is selectively Enabled or Disabled by an "ACK disable" bit during a SF depending on channel condition. In this disclosure, "dynamic" means that HARQ is configurable to be enabled or disabled on a "per burst" or per frame basis, which does not necessarily mean a "real time" change.

Various metrics may be used in making the initial and subsequent decisions as to whether to enable or disable HARQ. For example, Standard Deviation (SD) of PCINR, or error rate r=NACK/(ACK+NACK) may be used either alone or in combination to aid in making a threshold decision on HARQ enablement.

In one embodiment, a method of increasing data throughput in a wireless communications network over which a radio frequency (RF) signal is transmitted between a base station (BS) and one or more subscriber stations (SS) and/or mobile stations (MS) over a communications channel having a time-varying measure of quality includes establishing a service flow (SF) and initially enabling a hybrid automated repeat request (HARQ) protocol between the BS and the MS; determining, at a particular time, the measure of quality of the communications channel; comparing the determined measure of quality with a predetermined channel quality threshold; and selectively disabling the HARQ protocol based upon a first comparison result while continuing the SF between the BS and MS. In one aspect of this embodiment, the method further includes determining, at a subsequent time, that the time-varying measure of quality of the communications channel has deteriorated below the predetermined channel quality threshold; and selectively reenabling the HARQ protocol in the established SF.

In another embodiment, a base station (BS) coupled to one or more subscriber stations (SS) and/or mobile stations (MS) over a wireless radio access network (RAN) includes a transceiver; a baseband processor coupled to said transceiver; a hybrid automatic repeat request (HARQ) processor coupled to said baseband processor and which includes an ACK/NACK processing module; a channel quality evaluation module; a HARQ enable/disable controller operatively coupled to said ACK/NACK processing module and said channel quality evaluation module and operative to selectively enable and/or disable a HARQ protocol within an established service flow (SF). In one aspect of this embodiment, if the HARQ protocol is enabled, the HARQ enable/disable controller is configured to compute a metric m comprising a ratio of a Standard Deviation (SD) of a Physical Carrier-to-Interference-Ratio (PCINR) reported by one of the one or more subscriber stations (SS) and/or mobile stations (MS) to a packet error rate r determined by the BS, wherein the metric m=SD/r, and r=NACK/(ACK+NACK); and responsive to a first comparison result between the computed metric m and an operator-selectable first threshold value, the HARQ enable/disable controller is further configured to selectively disable the HARQ protocol within the established service flow (SF). In a further aspect of this embodiment, if the HARQ protocol is disabled, the HARQ enable/disable controller is configured to compare the SD to an operator-selectable second threshold value and determine a second comparison result; and selectively reenable the HARQ protocol within the established service flow (SF) in response to the second comparison result.

In another embodiment, a computer-readable medium includes computer readable code embodied therein which, when executed by a computer, causes the computer to carry out the functions of establishing a service flow (SF) and initially enabling a hybrid automated repeat request (HARQ) protocol between the BS and the MS; determining, at a particular time, the measure of quality of the communications channel; comparing the determined measure of quality with a predetermined channel quality threshold; selectively disabling the HARQ protocol based upon a first comparison result while continuing the SF between the BS and MS; after selectively disabling the HARQ protocol, determining, at a subsequent time, that the time-varying measure of quality of the communications channel has deteriorated below the predetermined channel quality threshold; and selectively reenabling the HARQ protocol in the established SF.

BRIEF DISCUSSION OF THE DRAWINGS

FIG. 1 provides a block diagram of a conventional wireless communication system in which the system and method of this disclosure may be implemented;

FIG. 2 provides an example of conventional MAC layer ARQ operation in a wireless communications systems;

FIG. 3A provides a graphical representation of PCINR data for a communications channel having a relatively high Standard Deviation over time;

FIG. 3B provides a graphical representation of PCINR data for a communications channel having a relatively low Standard Deviation over time;

Figure 6:
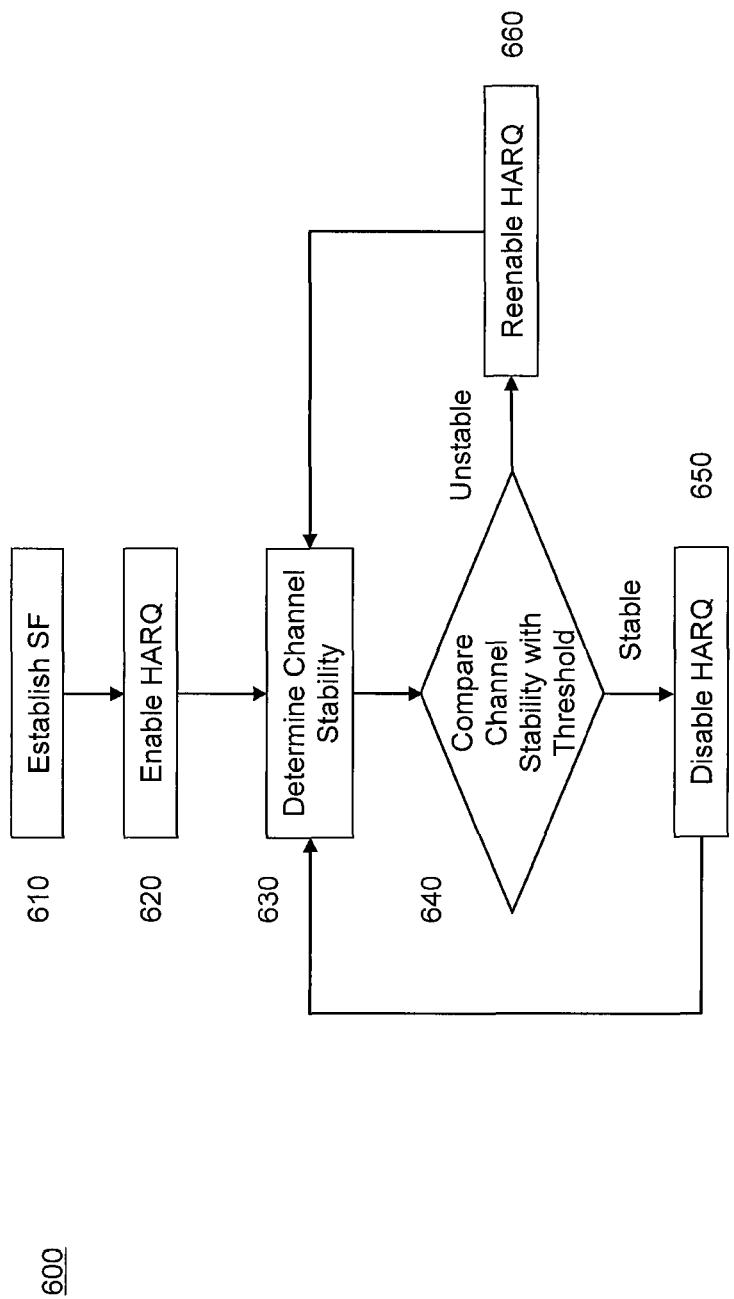
Figure 7:
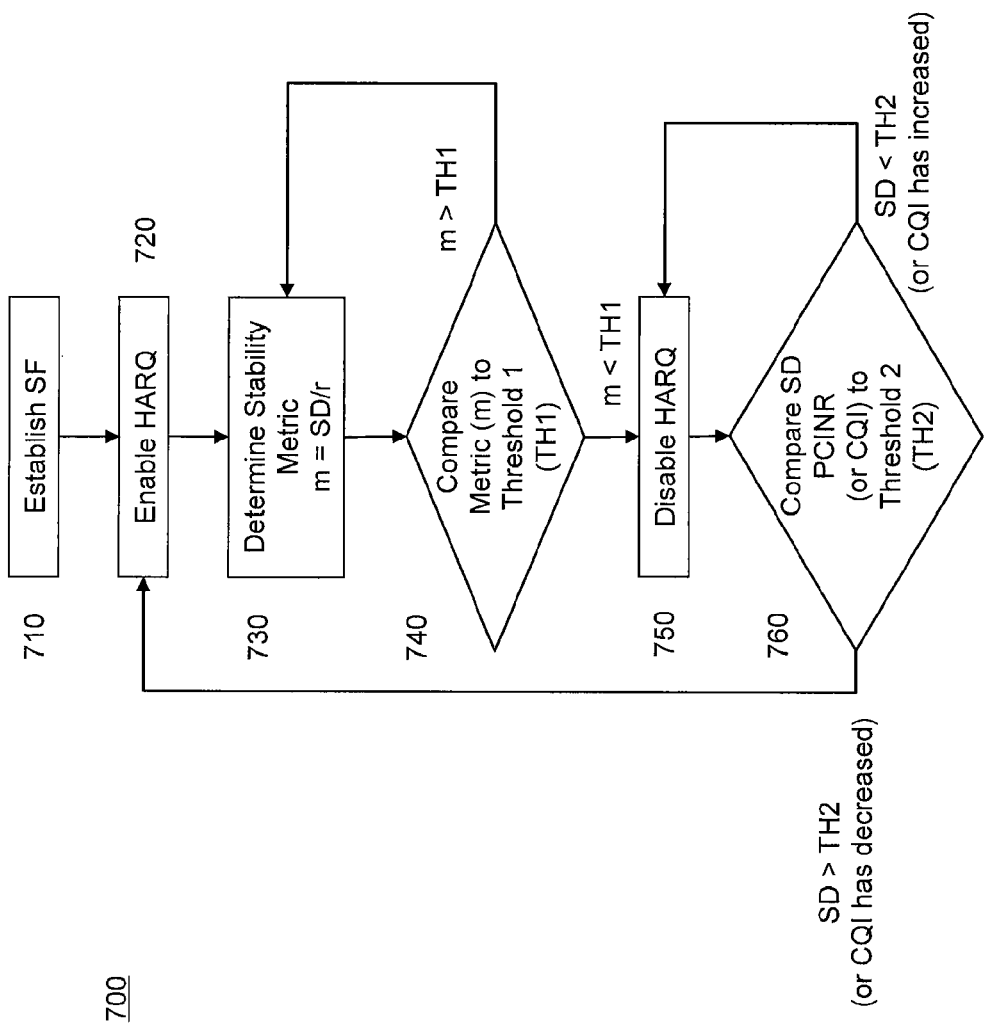

FIG. 6 provides a flowchart of a method of an embodiment;

FIG. 7 provides a flowchart of a method of an embodiment; and

FIG. 8 provides a functional block diagram of a Base Station illustrating a HARQ processing module of an embodiment.

DETAILED DESCRIPTION

In the discussion of various embodiments and aspects of the system and method of this disclosure, examples of MS/SS 130 may include any one or more of, for instance, a personal computer, portable computer, personal digital assistant (PDA), workstation, web-enabled mobile phone, WAP device, web-to-voice device, or other device. Those with skill in the art will appreciate that the inventive concept described herein may work with various system configurations.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

According to various embodiments, CQI Channels 160a-160n in FIG. 1 may include a Standard Deviation of the channel condition information described above. In other words, MS/SS 130n may report a Standard Deviation of channel condition information. Standard Deviation of the channel condition information may indicate the combined effect of Doppler and fading. For example, a higher PCINR Standard Deviation over a number of time points may indicate high Doppler and fast fading effects on the communication channel throughout the number of time points as compared to a lower PCINR Standard Deviation. Each time point may represent a transmission of a communication between BS 110 and MS/SS 130 on a communication channel. A lower PCINR Standard Deviation may indicate low Doppler and low fading effects throughout the number of time points as compared to a higher PCINR Standard Deviation. Thus, the PCINR Standard Deviation, for example, may be used to indicate channel condition of the communication channel throughout the number of time points. The number of time points observed by the MS/SS 130 in order to generate the Standard Deviation may be configurable. In other words, a vendor implementing the system or method may vary the number of time points used to generate the Standard Deviation. For example, the number of time points may include all or a portion of the number of time points since communication on a communication channel is established between BS 110 and MS/SS 130n.

FIG. 3A is a two-dimensional graph illustrating an example of PCINR data 308a over time 304 exhibiting relatively high Standard Deviation about a mathematical mean PCINR 306a, according to an embodiment. PCINR values 302 are shown as a function of time 304. It should be understood that in FIG. 3A and any other figures illustrating a two-dimensional graph herein, the graphs are illustrative only and should not be viewed as limiting. For example, the axes may be reversed as appropriate without departing from the scope of this disclosure. As previously noted, a higher Standard Deviation of PCINR, for example, over a number of time points may indicate high Doppler and fast fading effects of the communication channel as compared to a lower Standard Deviation.

FIG. 3B is a two-dimensional graph illustrating an example of PCINR data 308b over time 304 exhibiting relatively low PCINR Standard Deviation about a mathematical mean PCINR 306b, according to an embodiment. PCINR values 302 are shown as a function of time 304. As previously noted, a lower PCINR Standard Deviation, for example, over a number time points may indicate low Doppler and slow fading effects of the communication channel as compared to a higher PCINR Standard Deviation.

BS 110 may be configured to use the PCINR information from CQI Channels 160n to perform downlink adaption for a subsequent communication with MS/SS 130n. In particular, if HARQ is not enabled, BS 110 may selectively enable HARQ according to the Standard Deviation of PCINR reported by a particular MS/SS 130. Thus, channel condition information based on CQI or PCINR data may enhance the ability of BS 110 to select a more appropriate signaling scheme (i.e., to either selectively and dynamically enable or disable HARQ) for communications to reflect changing channel conditions as compared to a static implementation of HARQ-enabled or disabled.

According to various embodiments, HARQ ACKCH channels 150n may include another type of channel stability information, such as, for example, an ACK/NACK ratio. The ACK/NACK ratio indicates a ratio of successful transmissions and non-successful transmissions, thereby indicating channel stability.

ACK/NACK feedback information provides useful information representing a channel condition and HARQ performance. During a certain time window, if most feedbacks are ACKs, then that implies that channel is good or HARQ is working very well in unstable channel condition. The error rate r is defined by r=NACK/(ACK+NACK). If r is relatively high, it implies that the channel is not good (e.g., unstable) or that HARQ, if enabled, is not working well. If r is relatively low, it implies that the channel is good or that HARQ is working very well with the unstable channel condition.

Although both SD PCINR and error rate r provide useful information, synergy may be achieved by the use of these two parameters in combination as a measure of channel stability. In one or more embodiments, a metric m combining SD PCINR with ACK/NACK feedback, i.e., r, is defined as:

$$m=SD/r,$$

where SD is the Standard Deviation of PCINR and $$r=NACK/(ACK+NACK).$$

If SD is relatively high and error rate r is relatively low such that the metric m is a relatively large number, the channel is unstable and the error rate is low. In this situation, better overall system performance would be obtained by keeping HARQ enabled. However, if SD is low and the error rate r is high such that the metric m is small, the channel is stable and the error rate is high, better system performance would result by keeping HARQ disabled. Exemplary values for SD and r may be SD=6.3 (i.e., 8 dB), and r=10%, such that m=6.3/0.1=63. Other values for SD and r may be appropriate for different network requirements and conditions, as would be known to a person with ordinary skill in the art.

In various embodiments, HARQ is selectively and dynamically enabled or disabled based on feedback information from MS/SS 130, i.e., SD of PCINR alone (if HARQ is disabled) and in combination with packet error rate r=NACK/(ACK+NACK) (if HARQ is enabled), during a SF. HARQ enable (ON) and disable (OFF) are dynamically configured. HARQ ON/OFF states and their transitions are depicted in FIG. 4.

Figure 4:
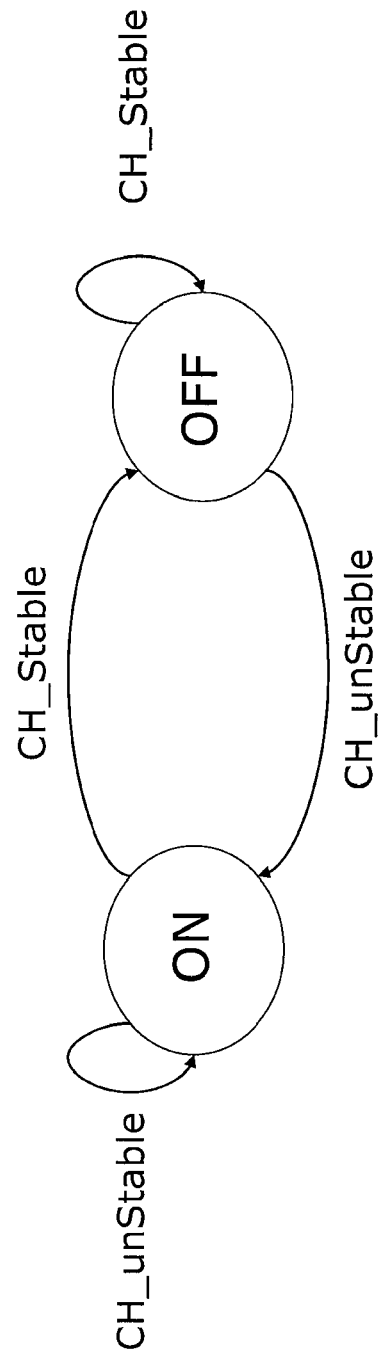
FIG. 4 illustrates a state diagram of HARQ ON/OFF states and their transitions for various channel conditions in one or more embodiments.

In FIG. 4, for the state where HARQ is "OFF", and if the channel is stable, then no gain from HARQ would be expected. A stable channel implies that the SD of PCINR is low or that the PCINR is increased. When the channel becomes unstable, then a processing gain from enabling HARQ would be expected. This implies that SD of PCINR is high, i.e., PCINR has high variability due to doppler or fading, for example, or that PCINR has decreased.

For the state in FIG. 4 where HARQ is "ON", a stable channel condition could also imply that the number of packet errors represented by the number of NACKs is low. An unstable channel condition implies that the number of packet errors represented by the number of NACKs is high. Standard Deviation of PCINR may represent channel fluctuation. If the Standard Deviation is relatively high, it implies that a channel is more fluctuating. If the Standard Deviation is low, it implies that a channel is relatively stable. In a relatively high fluctuating channel environment, HARQ could be more beneficial to achieve the target burst error rate (1%) with lower CINR than required at the target error rate (1%), i.e., a high gain from the use of HARQ could be expected. In a relatively stable channel environment, HARQ gain may not be achieved or expected as much in the case of an unstable channel condition.

Figure 5:
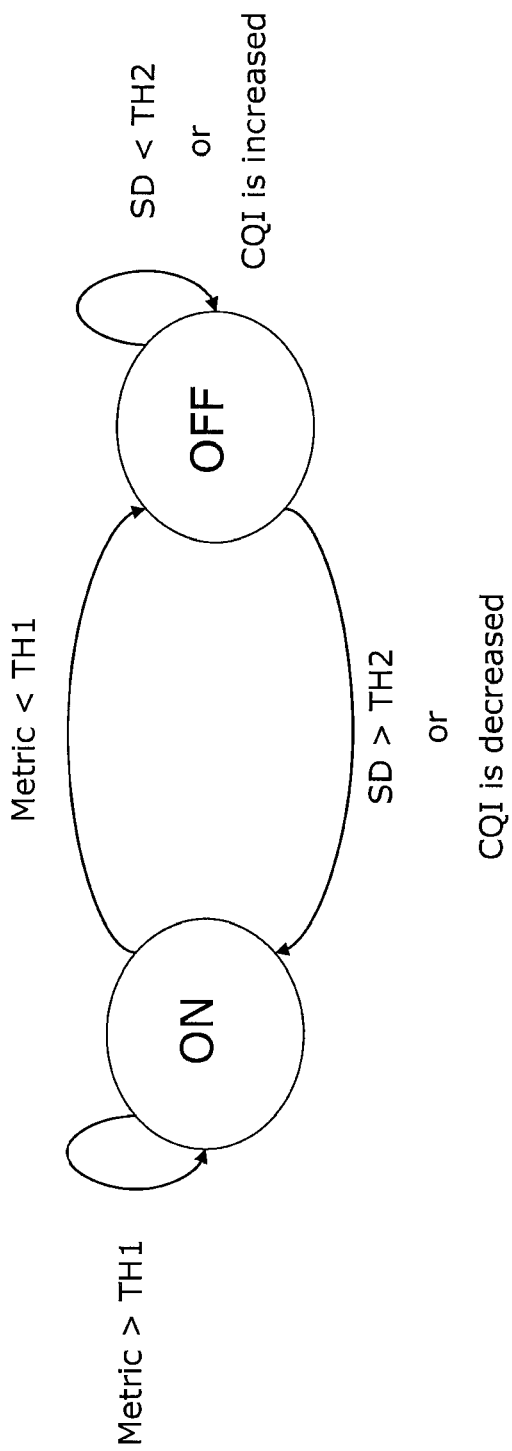
FIG. 5 illustrates a state transition condition for one or more embodiments in which a decision rule is applied to improve network performance in terms of throughput and capacity.

Based on the rationale above, the state diagram of FIG. 5 can be defined, where TH1 and TH2 are operator-selectable/configurable thresholds for metric m and SD, respectively. If HARQ is enabled, and if metric m>TH1, then HARQ should remain enabled. If, however, metric m<TH1, then HARQ should be turned off. Once HARQ is disabled, there are no "ACKS" or "NACKS" to determine the error rate r. Consequently, SD PCINR may be used to assess the channel stability/quality. If SD<TH2, or if the CQI has increased, then HARQ should remain disabled. However, if SD>TH2, or if CQI is decreased, then the state should transition to HARQ enabled. By applying the decision rules, the communications network can improve throughput and capacity. It should be noted that the state transition diagrams in FIGS. 4 and 5 are occurring during a previously established SF, contrary to conventional approaches which use HARQ in a static and unchanging mode.

A flowchart of a method of an embodiment is provided in FIG. 6. Process 600 starts at step 610, in which a service flow (SF) is established between the BS and a MS, for example. A HARQ signaling protocol is enabled at step 620. Thereafter, channel stability is determined at step 630 by one or more techniques, as discussed above, e.g., SD PCINR, error rate r, CQI, or metric m. A comparison is made between the current measure of channel stability and an operator-selectable threshold at step 640. If the channel is assessed as being stable, then the HARQ protocol is disabled at step 650, and the process returns to step 630 to re-determine channel stability. If, however, the channel is assessed as being unstable at step 640, then the process moves to re-enable HARQ signaling at step 660, after which the process returns to step 630 to re-determine channel stability.

A flowchart of a method of an embodiment is provided in FIG. 7. Process 700 starts at step 710, in which a service flow (SF) is established between the BS and a MS, for example. A HARQ signaling protocol is enabled at step 720. Since HARQ is now enabled, ACKs and NACKs may be received in addition to channel quality information, which may be in the form of SD of PCINR. A stability metric m=SD/r is determined at step 730, and the resultant metric m is compared to a first operator-selectable threshold value TH1 at step 740. If m>TH1, then the process continues by returning to step 730 to re-determine the stability metric, m. If, however, m<TH1, then HARQ is disabled at step 750. Since HARQ is disabled, ACKs and NACKs are no longer available to assess communications channel quality. So now, SD PCINR or CQI may be used at step 760 for comparison to a second operator-selectable threshold TH2. If SD<TH2, then the process returns to step 750 with HARQ remaining disabled until SD>TH2, after which the process returns to enable HARQ at step 720.

In the embodiment of FIG. 8, a base station base station (BS) is communicatively coupled to one or more subscriber stations (SS) and/or mobile stations (MS) over a wireless radio access network (RAN). The base station includes transceiver 810 coupled to baseband processor 820. HARQ processor 830 is coupled to baseband processor 820. HARQ processor 820 includes ACK/NACK processing module 831 that is configured to receive and process ACKs and/or NACKs, and to determine a packet error rate, for example. A channel quality evaluation module, e.g., SD PCINR/CQI evaluation module 833 is configured to evaluate indications of channel quality transmitted over CQI channels 160n. HARQ enable/disable controller 835 is operatively coupled to ACK/NACK processing module 831 and channel quality evaluation module 833, and operates to selectively enable and/or disable a HARQ protocol within an established service flow (SF) depending on evaluation of SD PCINR and/or packet error rate. Memory 837 may be available to one or more of the above modules for storing data, including any operator-selectable threshold values.

SD PCINR/CQI evaluation module 833 may be configured to utilize SD PCINR that represents communications channel fluctuation reported by one of the one or more SS and/or MS to determine a relative channel quality, or SD PCINR/CQI evaluation module 833 may utilize a channel quality indication (CQI) reported by one of the one or more SS and/or MS.

ACK/NACK processing module 831 may be configured to determine a packet error rate r, wherein r=NACK/(ACK+NACK). Further, if the HARQ protocol is enabled, HARQ enable/disable controller 835 may be configured to compute the metric m described above. Further, responsive to a first comparison result between the computed metric m and an operator-selectable first threshold value, HARQ enable/disable controller 835 may be further configured to selectively disable the HARQ protocol within the established SF.

If the HARQ protocol is disabled, the HARQ enable/disable controller 835 may be configured to compare the SD to an operator-selectable second threshold value and to determine a second comparison result and, depending on the second comparison result, HARQ enable/disable controller 835 may selectively reenable the HARQ protocol within the established SF. In addition, the first and second operator-selectable threshold values may be determined and selected based upon a desired quality of service (QoS) for the established SF in the wireless radio access network.

In addition, base station 800 may also include a computer interface configured to allow a user to monitor system parameters and to input selected threshold values into a memory associated with the HARQ processor.

The various modules and interfaces described above can be implemented by any number of processors, memory, and input/output devices, as are known in the art.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of increasing data throughput in a wireless communications network over which a radio frequency (RF) signal is transmitted between a base station (BS) and a mobile station (MS) over a communications channel having a time-varying measure of quality, the method comprising:
    enabling a hybrid automated repeat request (HARQ) protocol between the BS and the MS, wherein a service flow (SF) is established between the BS and the MS;
    comparing the time-varying measure of quality of the communications channel with a predetermined channel quality threshold, wherein the time-varying measure of quality of the communications channel is determined based upon a ratio of a statistic of a Physical Carrier-to-Interference-Ratio (PCINR) reported by the MS and a packet error rate for packets transmitted between the BS and the MS; and
    selectively disabling the HARQ protocol based upon a comparison result of said comparing operation while continuing the SF between the BS and MS.

2. The method of claim 1, wherein the statistic comprises a Standard Deviation (SD) of the PCINR.

3. The method of claim 2, wherein the packet error rate, r=NACK/((ACK+NACK).

4. The method of claim 1, wherein, after selectively disabling the HARQ protocol:
    determining that the time-varying measure of quality of the communications channel has deteriorated below the predetermined channel quality threshold; and
    selectively reenabling the HARQ protocol in the established SF.

5. The method of claim 4, wherein, after the HARQ protocol is selectively reenabled, maintaining the HARQ protocol as enabled, based upon a determination that the time-varying measure of quality of the communications channel is determined to be greater than an operator-selectable first threshold value.

6. The method of claim 1, wherein, after the HARQ protocol is selectively disabled, maintaining the HARQ protocol as disabled, based upon a determination that the time-varying measure of quality of the communications channel is determined to be less than an operator-selectable second threshold value.

7. The method of claim 1, wherein the HARQ protocol is used in a WiMAX network implemented, at least in part, under the IEEE Standard 802.16.

8. A base station (BS) coupled to one or more subscriber stations (SS) and/or mobile stations (MS) over a wireless radio access network (RAN), the base station comprising:
    a transceiver;
    a baseband processor coupled to said transceiver; and
    a hybrid automatic repeat request (HARQ.) processor coupled to said baseband processor, said HARQ processor comprising:
        a channel quality evaluation module configured to determine a relative channel quality based upon a ratio of a statistic of a Physical Carrier-to-Interference-Ratio (PCINR) reported by one of the one or more subscriber stations (SS) and/or mobile stations (MS) and a packet error rate for packets transmitted between the BS and the SS and/or MS; and
        a HARQ enable/disable controller operatively coupled to said channel quality evaluation module and configured to selectively enable and/or disable a HARQ protocol within an established service flow (SF) based upon the relative channel quality.

9. The base station of claim 8, wherein said HARQ processor further comprises an ACK/NACK processing module configured to determine the packet error rate r, wherein r=NACK/(ACK+NACK).

10. The base station of claim 8, wherein the statistic comprises a Standard Deviation (SD) of the PCINR.

11. A non-transitory computer-readable storage medium storing computer readable code thereon which, when executed by a computer, causes the computer to carry out operations related to increasing data throughput in a wireless communications network over which a radio frequency (RF) signal is transmitted between a base station (BS) and a mobile station (MS) over a communications channel having a time-varying measure of quality, the operations comprising:
    enabling a hybrid automated repeat request (HARQ) protocol between the BS and the MS, wherein a service flow (SF) is established between the BS and the MS;
    comparing the time-varying measure of quality of the communications channel with a predetermined channel quality threshold, wherein the time-varying measure of quality of the communications channel is determined based upon a ratio of a statistic of a Physical Carrier-to-Interference-Ratio (PCINR) reported by the MS and a packet error rate for packets transmitted between the BS and the MS; and
    selectively disabling the HARQ protocol based upon a comparison result of said comparing operation while continuing the SF between the BS and MS.

12. The computer-readable storage medium of claim 11, wherein the statistic comprises a Standard Deviation (SD) of the PCINR.

13. The computer-readable storage medium of claim 11, wherein the packet error rate, r=NACK/(ACK+NACK).

* * * * *